(12) United States Patent
Aiello (10) Patent No.: US 7,898,780 B2
(45) Date of Patent: Mar. 1, 2011

(54) ELECTRONIC DIFFERENTIAL SWITCH

(75) Inventor: Natale Aiello, Trecastagni (IT)

(73) Assignee: STMicroelectronics S.r.l., Agrate Brianza (MI) (IT)

( * ) Notice: Subject to any disclaimer, the term of this patent is extended or adjusted under 35 U.S.C. 154(b) by 201 days.

(21) Appl. No.: 11/565,109

(22) Filed: Nov. 30, 2006

(65) Prior Publication Data

US 2007/0146943 A1   Jun. 28, 2007

(30) Foreign Application Priority Data

Nov. 30, 2005  (EP) ................... 05425852

(51) Int. Cl.
  *H02H 3/05* (2006.01)
  *H02H 3/06* (2006.01)
(52) U.S. Cl. ........................................ 361/45
(58) Field of Classification Search ............. 361/42–50
  See application file for complete search history.

(56) References Cited

U.S. PATENT DOCUMENTS

| 4,574,324 | A | * | 3/1986 | Packard ................. 361/46 |
| 4,979,070 | A | | 12/1990 | Bodkin |
| 5,841,615 | A | | 11/1998 | Gershen |
| 5,969,921 | A | * | 10/1999 | Wafer et al. ............. 361/45 |
| 6,621,670 | B2 | * | 9/2003 | Hayakawa et al. ........ 361/42 |
| 2003/0189804 | A1 | | 10/2003 | Kampmeyer |
| 2003/0198001 | A1 | * | 10/2003 | Lile ................... 361/157 |

FOREIGN PATENT DOCUMENTS

| EP | 1 439 623 A2 | 7/2004 |
| GB | 2 170 367 A | 7/1986 |

OTHER PUBLICATIONS

Preliminary Search Report for European Patent Application No. 05 42 5852, dated Jul. 28, 2006.

* cited by examiner

*Primary Examiner*—Jeffrey L Sterrett
*Assistant Examiner*—Fred E Finch, III
(74) *Attorney, Agent, or Firm*—Lisa K. Jorgenson; Stephen Bongini; Fleit Gibbons Gutman Bongini & Bianco P.L.

(57) ABSTRACT

An electronic differential switch is provided that is connected to a phase cable and a neutral cable of an electric network. The electronic differential switch includes a first winding associated with a second winding, at least one toroid associated with the first winding, a diode bridge, a driving relay for a main switch connected to the phase and neutral cables, an integrated circuit for measuring a differential current flowing in the first winding and generating a driving signal, and at least one driven switch coupled to the integrated circuit and driven by the driving signal. The first and second windings are coupled to one another through the integrated circuit and the diode bridge. The at least one driven switch is coupled to the driving relay through the diode bridge so as to excite the driving relay and close the main switch, or release the driving relay and open the main switch. Also provided is a method for controlling an alarm condition in an electric network.

23 Claims, 6 Drawing Sheets

ELECTRONIC DIFFERENTIAL SWITCH

CROSS-REFERENCE TO RELATED APPLICATIONS

This application is based upon and claims priority from prior European Patent Application No. 05 425 852.0, filed Nov. 30, 2005, the entire disclosure of which is herein incorporated by reference.

FIELD OF THE INVENTION

The present invention relates to an electronic differential switch, and to a method for controlling an alarm condition in an electric network that includes at least one phase cable and one neutral cable associated with a main switch.

BACKGROUND OF THE INVENTION

It is well known that differential switches are components widely used as protection instruments in buildings and/or industrial plants (commonly called an automatic cut-out) or as instruments for verifying the correct use of electric supplies (for example, as anti-tampers in electronic meters).

In particular, a differential switch is connected to the cables conducting the electric current, usually indicated as phase and neutral. In general, the current enters through the phase, crosses the circuits of the system connected to the differential switch, and goes out from the neutral.

Under normal conditions the entering current must be equal to the current going out. If this does not occur, it means that a part of the current is crossing different paths, such as a human body in the case of an electric shock (direct contact) or dispersion paths due to insulator failure, for example, of a household appliance connected to a ground system.

The differential switch thus continuously compares the entering current with the current going out, and intervenes when it detects a difference of current, indicating an "alarm" event.

At present, there exist two main categories of differential switches:

1) electromechanical differential switches that are based on a mechanical system for the activation of the switch in the presence of the alarm event; and 2) electronic differential switches which use an electronic circuit for the detection of the alarm event and the activation of the switch.

Especially when used as protection instruments, human life being possibly at stake, these differential switches require particular safety guarantees which minimize the likelihood of missed intervention due to a possible failure of the switch itself.

All the differential switches on sale also have a "test" button (usually indicated with a letter T stamped on it) for verifying the functionality of the switch itself by generating a leakage current inside the circuit that forms the switch.

Figure 1:
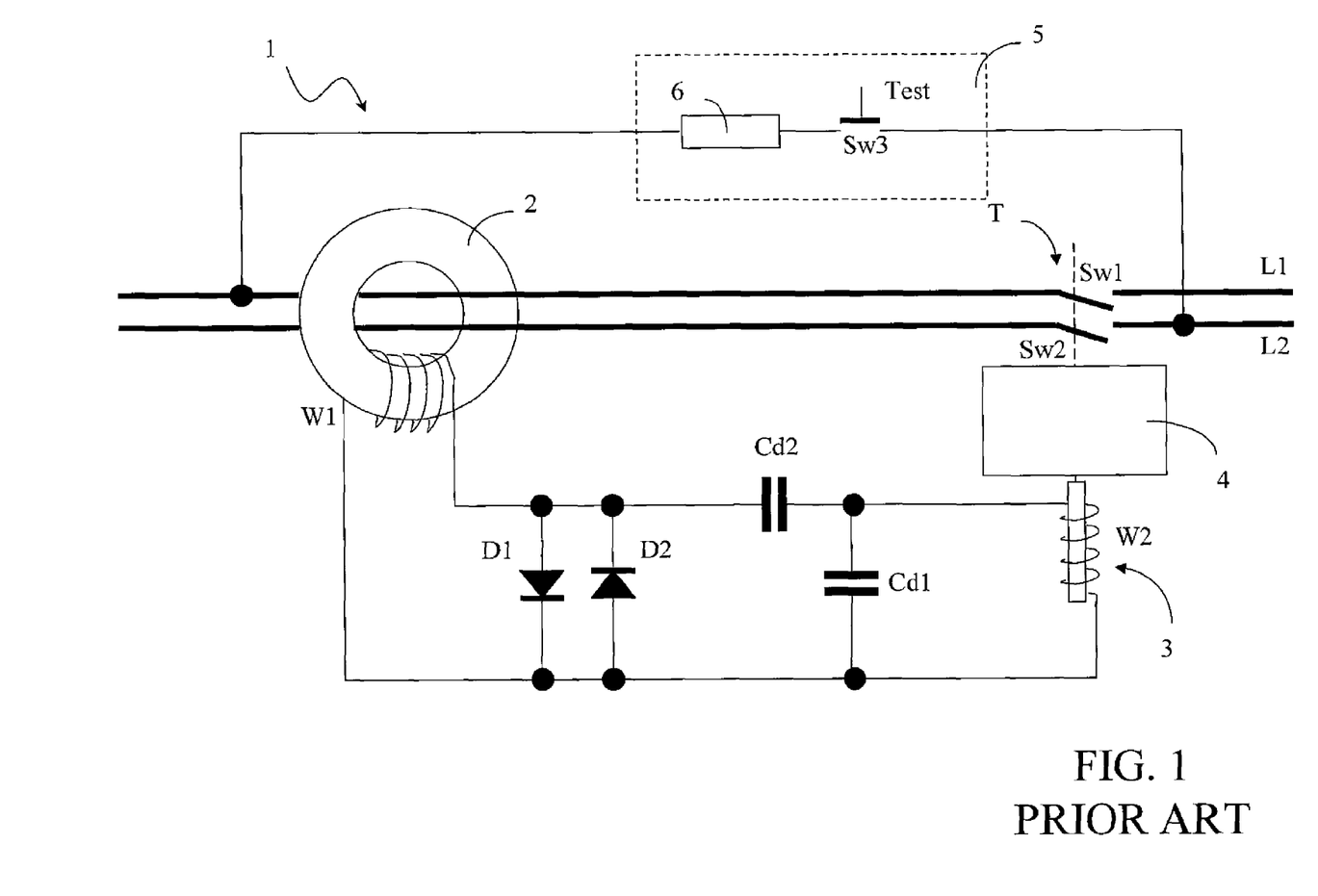
FIG. 1 shows a conventional differential switch of the electromechanical type.

A differential switch of the electromechanical type that is commercially available is shown in FIG. 1.

In particular, the electromechanical differential switch 1 comprises a toroid 2 in which the cables of an electric network are inserted, in particular a phase cable L1 and a neutral cable L2.

The toroid 2 is associated with a first winding W1 that is connected, through a first decoupling capacitor Cd1, to a second winding W2, which is associated with a relay 3, which is connected to a driving mechanical system 4 for a pair of switches Sw1 and Sw2 that are connected to the phase L1 and neutral L2 cables, respectively. The switches Sw1 and Sw2 form the main switch T. In substance, the first winding W1 is the winding measuring the differential current while the second winding W2 is the winding exciting the relay 3.

The electromechanical differential switch 1 also comprises a pair of diodes D1 and D2—in opposite configuration with respect to one another—and the first decoupling capacitor Cd1, inserted in parallel to the windings W1 and W2, as well as a second decoupling capacitor Cd2, inserted in series between the pair of diodes D1 and D2 and the first decoupling capacitor Cd1.

The electromechanical differential switch 1 further comprises a test circuit 5 that is inserted between the phase cable L1 and the neutral cable L2 and includes the series of a resistance 6 and a test switch Sw3 associated with a test button of the differential switch, shown by a test driving signal Test.

Figure 2:
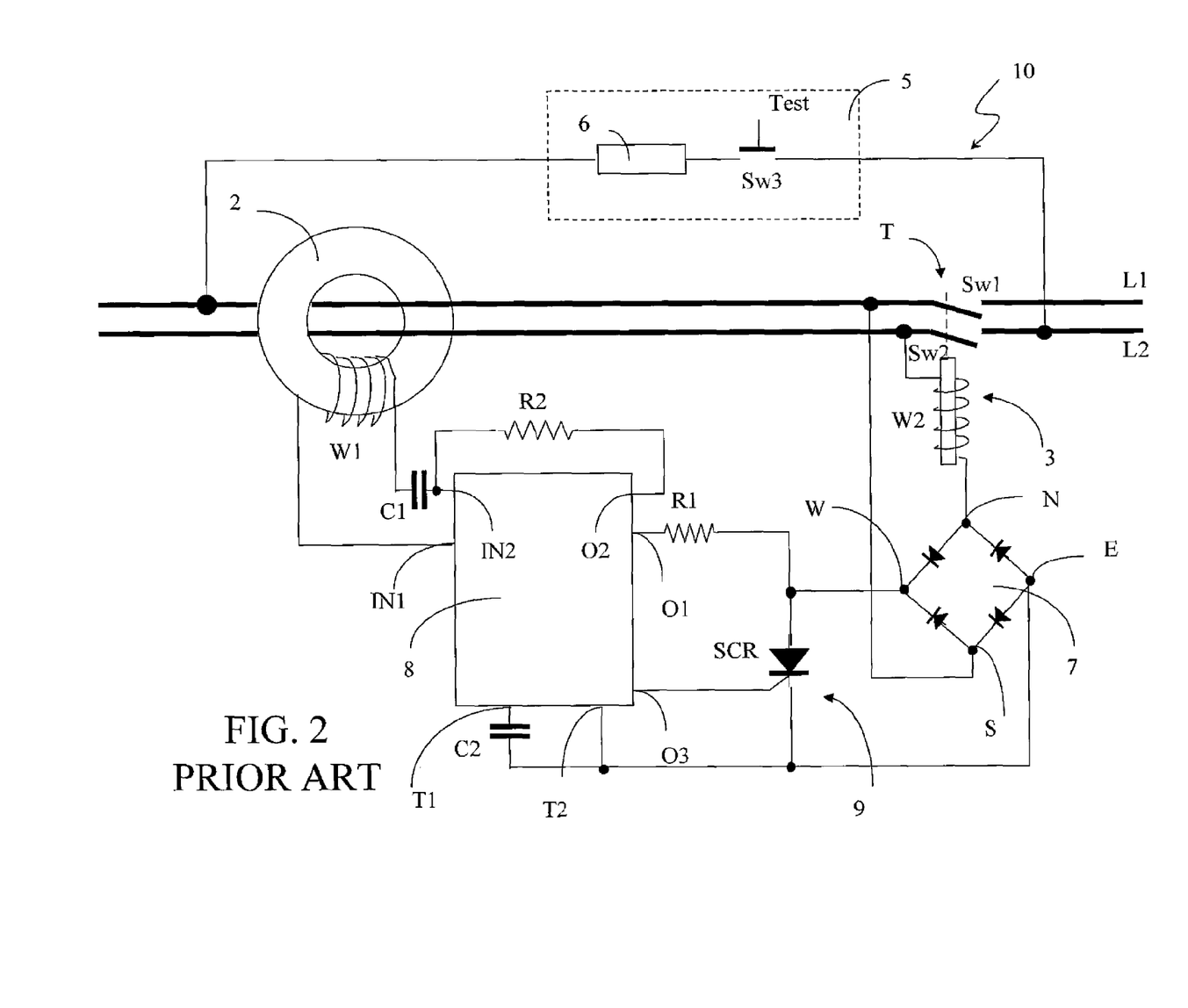
FIG. 2 shows a conventional differential switch of the electronic type.

An electronic differential switch of the type shown in FIG. 2 is also known. Elements being structurally and/or functionally identical to the electromechanical differential switch 1 described with reference to FIG. 1 are given the same reference numbers for sake of simplicity.

The electronic differential switch 10 comprises a toroid 2 in which a phase cable L1 and a neutral cable L2 of an electric network are inserted.

The toroid 2 is associated with a first winding W1, which is connected to an integrated circuit 8, which is connected to a diode 9 SCR, which drives a second winding W2, which is associated with a relay 3. The relay 3 directly drives a pair of switches Sw1 and Sw2 that are connected to the phase L1 and neutral L2 cables, respectively. The switches Sw1 and Sw2 form the main switch T.

In this cases the second winding W2 has a first end directly connected to the neutral cable L2 and a second end connected to the phase cable L1 through a diode bridge 7.

In particular, the diode bridge 7 has respective first N, second E, third S, and fourth W terminals, with the first terminal N being connected to the second end of the second winding W2 and the third terminal S being connected to the phase cable L1.

The electronic differential switch 10 also comprises the integrated circuit 8, for measuring a differential current, inserted between the first winding W1 and the diode 9 SCR ("Silicon Controller Rectifier").

In particular, the integrated circuit 8 has a first input terminal IN1 directly connected to a first end of the first winding W1 and a second input terminal IN2 connected to a second end of the first winding W1 through a first capacitor C1, as well as a first output terminal O1 connected to a first end of the diode 9 SCR through a first resistor R1, a second output terminal O2 feedback connected to the second input terminal IN2 through a second resistor R2, and a third output terminal O3 connected to a driving terminal of the diode 9 SCR.

The integrated circuit 8 also has a first biasing terminal T1 connected to the second terminal E of the diode bridge 7 through a second capacitor C2 for timing the system intervention, and a second biasing terminal T2 that is also connected to the second terminal E of the diode bridge 7. The second terminal E is connected to a ground voltage reference GND.

The diode 9 SCR has a first end connected to the fourth terminal W of the diode bridge 7 (and thus to the first output terminal O1 of the integrated circuit 8 through the first resistor R1) and a second end connected to the second terminal E of the diode bridge 7 (and thus to the first biasing terminal T1 of the integrated circuit 8 through the second capacitor C2 as well as to the second biasing terminal T2 of the integrated circuit 8).

The differential switch 10 further comprises a test circuit 5 that is inserted between the phase cable L1 and the neutral cable L2 and includes the series of a resistance 6 and a test switch Sw3 associated with a test button of the differential switch, shown by a test driving signal Test. The value of the resistance 6 determines the simulated failure current.

The integrated circuit 8 measures a differential current correlated to the currents $I_F$ and $I_N$ flowing in the phase L1 and neutral L2 cables, respectively.

In particular, if the current $I_F$ circulating in the phase cable L1 is equal to the current $I_N$ flowing back through the neutral cable L2 (i.e., if the condition $I_F - I_N = 0$ occurs), there is no linked flow in the toroid 2 inducing a void voltage in the first winding W1, and consequently the second winding W2 will not be excited by the diode 9 SCR.

Under these conditions, the integrated circuit 8, detecting no voltage difference at its input terminals IN1 and IN2 (which are connected to the first winding W1), maintains the diode 9 SCR off through a suitable voltage value applied thereto by the third output terminal O3. In this way the relay 3 is not excited and the main switch T (connected to the diode 9 SCR through the diode bridge 7) remains closed.

If, for any reason, a current leakage to ground occurs downstream of the electronic differential switch 10, the difference between the two currents $I_F$ and $I_N$ circulating in the phase L1 and neutral L2 cables is different than zero with consequent presence of a linked flow in the toroid 2, and thus non-void voltage variation at the terminals of the first winding W1. This voltage variation is applied at the input terminals IN1 and IN2 of the integrated circuit 8, which, after a fixed time determined by the second capacitor C2, activates the diode 9 SCR through its third output terminal O3 with consequent excitation of the relay 3 and opening of the main switch T.

This condition remains until the electronic differential switch 10 is reset from the outside.

Although advantageous under several aspects, this first solution has several drawbacks including the following.
1) It does not ensure the intervention of the electronic differential switch 10. In fact, the only way to verify the operation of the switch itself is to activate the "test" button and thus the test circuit 5. Ensuring that the switch does not fail after the execution of this test operation is not possible; electromechanical differential switches also have this drawback.
2) In case of accidental intervention of the electronic differential switch 10 due to a sudden alarm event (such as a lightning strike), the protected condition of the main switch release remains after the end of the alarm event. In particular, the known type of electronic differential switch 10 is not able, unless it uses more complex systems, to distinguish between a real failure current and one due to an external disturbance or noise which is introduced into the controlled system, with consequent problems in case of protections inserted in the presence of electric apparatuses requiring a continuous supply.

SUMMARY OF THE INVENTION

Preferred embodiments of the present invention provide an architecture for an electronic differential switch that is able to ensure a correct breakdown of the switch in case of failure and to allow the automatic reset of the switch in case of termination of the alarm event. In one embodiment, the driving logic of the switches connected to the electric network is inverted.

One embodiment of the present invention provides and electronic differential switch that is connected to a phase cable and a neutral cable of an electric network. The electronic differential switch includes a first winding associated with a second winding, at least one toroid associated with the first winding, a diode bridge, a driving relay for a main switch connected to the phase and neutral cables, an integrated circuit for measuring a differential current flowing in the first winding and generating a driving signal, and at least one driven switch coupled to the integrated circuit and driven by the driving signal. The first and second windings are coupled to one another through the integrated circuit and the diode bridge. The at least one driven switch is coupled to the driving relay through the diode bridge so as to excite the driving relay and close the main switch, or release the driving relay and open the main switch.

Another embodiment of the present invention provides a method for controlling an alarm condition in an electric network that includes a main switch, at least one phase cable and one neutral cable associated with the main switch, at least one driving relay for the main switch, and an integrated circuit coupled to the driving relay through a driven switch that is driven by a driving signal generated by the integrated circuit. According to the method, the main switch is closed through the integrated circuit closing the driven switch, in the absence of the alarm condition. The main switch is opened through the integrated circuit opening the driven switch, in the presence of the alarm condition. Initial conditions are automatically reset once the alarm condition ends through an automatic closing of the main switch by the integrated circuit closing the driven switch The characteristics and the advantages of the electronic differential switch and of the control method according to embodiments of the present invention will be apparent from the following description of embodiments thereof given by way of indicative and non limiting examples with reference to the attached drawings.

DETAILED DESCRIPTION OF PREFERRED EMBODIMENTS

With reference to the figures, electronic differential switches according to embodiments of the present invention are described. Elements that are structurally and/or functionally identical to the electronic differential switch 10 described with reference to and shown in FIG. 2 are given the same reference numbers for sake of simplicity.

Figure 3:
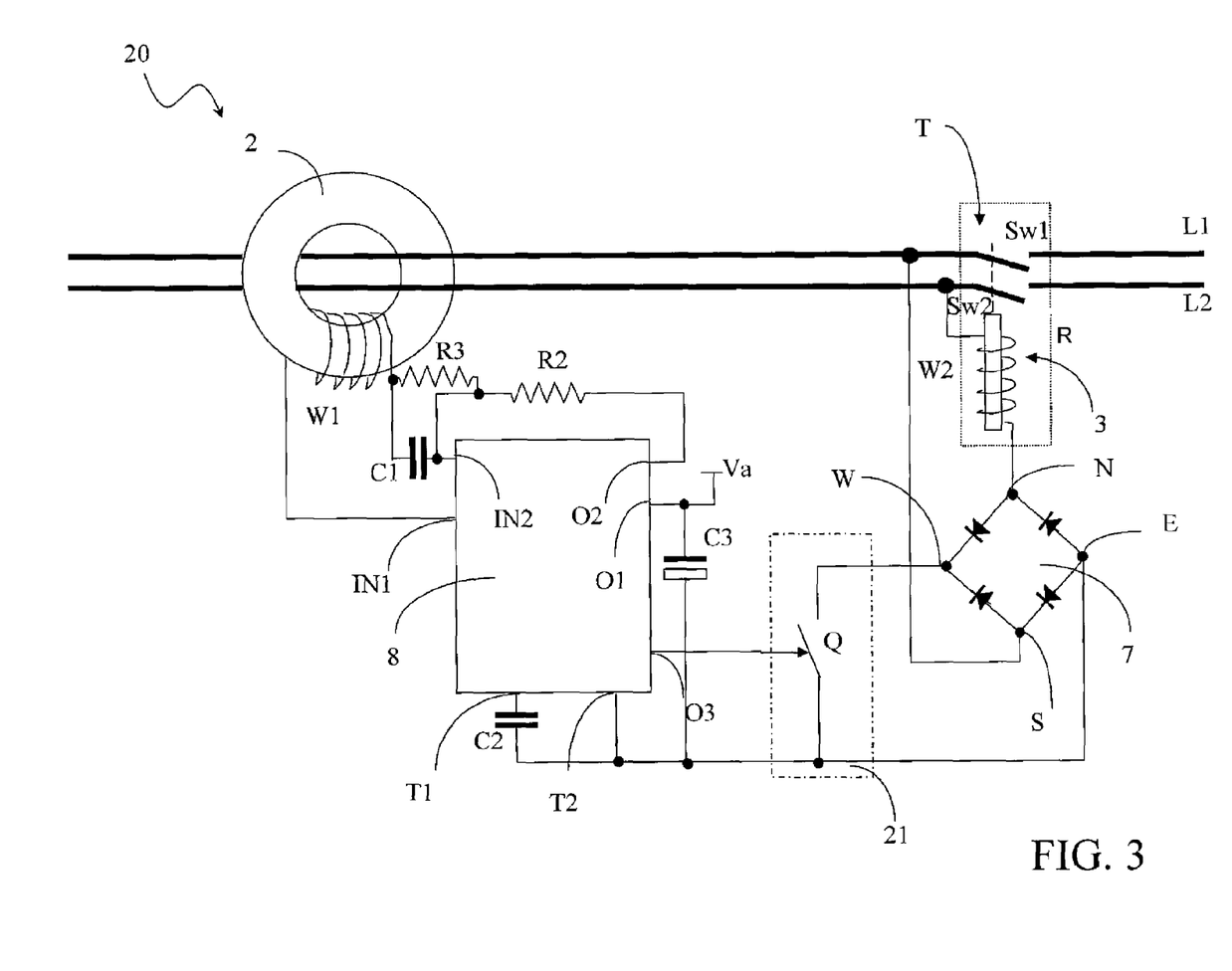
FIG. 3 shows a differential switch of the electronic type according to an embodiment of the present invention.

FIG. 3 shows an electronic differential switch 20 according to an embodiment of the present invention. The electronic differential switch 20 comprises a toroid 2 in which a phase cable L1 and a neutral cable L2 of an electric network are inserted.

The toroid 2 is associated with a first winding W1 that in turn is associated with a second winding W2, which is associated with a relay 3. The relay 3 directly drives a pair of switches Sw1 and Sw2 connected to the phase L1 and neutral L2 cables, respectively. The switches Sw1 and Sw2 form the main switch T.

In the conventional electronic differential switch 10, the second winding W2 has a first end directly connected to the neutral cable L2 and a second end connected to the phase cable L1 through a diode bridge 7. In particular, the diode bridge 7 has first N, second E, third S and fourth W terminals, with the first terminal N being connected to the second end of the second winding W2 and the third terminal S being connected to the phase cable L1.

The electronic differential switch 20 of FIG. 3 also comprises a measuring and driving integrated circuit 8 that is connected to the first winding W1, to measure a differential current flowing in the first winding W1 and to generate a suitable driving signal. In this embodiment of the present invention, the electronic differential switch 20 also comprises a driven switch 21 that is driven by the integrated circuit 8 and connected to the diode bridge 7, in particular between its fourth W and second E terminals.

The integrated circuit 8 has a first input terminal IN1 directly connected to a first end of the first winding W1 and a second input terminal IN2 connected to a second end of the first winding W1 through a first capacitor C1, as well as a first output terminal O1 connected to a first end of a supply capacitor C3 that is inserted between a supply voltage reference Va and the second terminal E of the diode bridge 7.

The integrated circuit 8 also has a second output terminal O2 feedback connected to the second input terminal IN2 through a first resistor R2, and a third output terminal O3 connected to a control terminal of the driven switch 21.

Further, the integrated circuit 8 has a first biasing terminal T1 connected to the second terminal E of the diode bridge 7 through a second capacitor C2, and a second biasing terminal T2 also connected to the second terminal E of the diode bridge 7.

The electronic differential switch 20 further comprises a second resistor R3 inserted in parallel to the first capacitor C1 between the first winding W1 and the first resistor R2.

In this embodiment of the present invention, the main switch T has a stand-by position (i.e., an open condition corresponding to the rest condition with non-excited solenoid of the relay 3), as shown in the example illustrated in FIG. 3.

In particular, the circuit architecture proposed for the electronic differential switch 20 ensures, in this way, the above indicated safety conditions thanks to the inversion of the driving logic governing the operation of the switch itself.

In particular the state of the driven switch 21 is always controlled by the integrated circuit 8 (no latch), while the relay 3 has a rest condition (corresponding to the condition of non-excited solenoid) with the main switch T (i.e., the switches Sw1 and Sw2) open.

The electronic differential switch 20 of this embodiment implements a method for controlling an alarm condition in an electric network that includes at least one phase cable L1 and one neutral cable L2 associated with a main switch. According to the method, the main switch T is closed through a closure of the driven switch 21 by the integrated circuit 8 in the absence of an alarm condition. The main switch T is opened through an opening of the driven switch 21 by the integrated circuit 8 in the presence of an alarm condition. Additionally, the electronic differential switch 20 is reset through automatic resetting of the initial conditions once the alarm condition ends, with this reset providing a closure of the main switch T through a closure of the driven 21 by the integrated circuit 8.

In this embodiment of the present invention, the method further includes a maintenance step in which the main switch T is maintained open for the whole duration of the alarm condition by the driven circuit 21, which in turn is kept open by the integrated circuit 8.

In particular, if no alarm condition is detected, i.e., if the current $I_F$ circulating in the phase cable L1 is equal to the current $I_N$ flowing back through the neutral cable L2 ($I_F - I_N = 0$), there is no linked flow in the toroid 2 (in particular in its first winding W1) and the integrated circuit 8, detecting no voltage difference at its input terminals IN1 and IN2 (which are connected to the first winding W1), maintains the driven switch 21 closed with consequent excitation of the relay 3 and closure of the main switch T.

On the contrary, if there is an alarm condition corresponding to the presence of a differential current detected at the inputs IN1 and IN2 of the integrated circuit 8, it opens the driven circuit 21, de-exciting the relay 3 which goes back to its rest condition (main switch T open).

Suitably, this driven switch 21 is maintained open by the integrated circuit 8 for the whole duration of the alarm condition or failure. In this case, the main switch T also remains open for the whole duration of the alarm condition.

In this embodiment of the present invention, once the alarm condition ends (for example, in the case of differential currents due to accidental causes such as a lightning strike), the main switch T is closed again by the driven switch 21, with an automatic resetting of the initial conditions. Thus, the electronic differential switch 20 according to this embodiment of the present invention makes it is possible to obtain, in a very simple way, an automatic reset of the switch itself.

The electronic differential switch 20 also ensures the safety of the system to which it is connected in most cases of failure of the switch itself.

In fact, in case of failure of the integrated circuit 8 or in case of disconnection of a cable (phase cable L1 or neutral case L2) with loss of the references by the integrated circuit 8 itself and consequent unreliability of the electronic differential switch 20, the driven switch 21 is not driven, with subsequent automatic deactivation of the main switch T so as to guarantee the safety for the one downstream of the electronic differential switch 20 itself. However, it is not possible to ensure the opening of the main switch T when the driven switch 21 fails, creating a short circuit.

Figure 4:
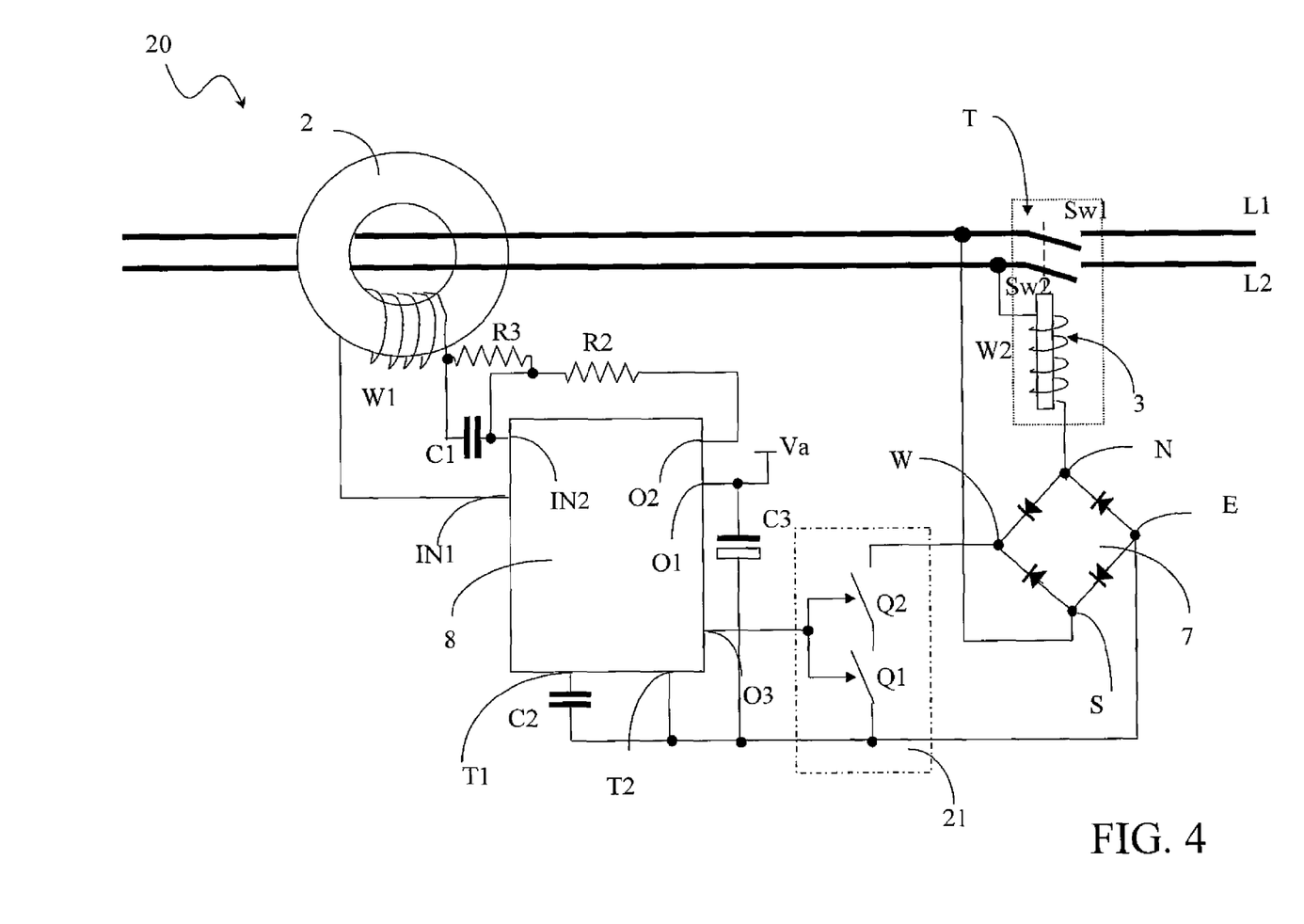
FIG. 4 shows a further embodiment of an electronic differential switch according to the present invention.

According to another embodiment of the present invention, it is possible to modify the architecture of the electronic differential switch 20 so as to also solve this failure condition, as shown in FIG. 4.

In particular, according to this embodiment of the electronic differential switch 20, the driven switch 21 comprises the cascade of two switches Q1 and Q2, which are both provided with a control terminal connected to the third output terminal O3 of the integrated circuit 8.

In this case, the possibility that both switches Q1 and Q2 are short-circuited in the same instant is negligible, and the electronic differential switch 20 always ensures safety conditions for the users downstream thereof.

Moreover, according to a preferred embodiment of the electronic differential switch 20, it is possible to introduce application requirements such as the turn-on of suitable LEDs connected to the electronic differential switch 20 so as to have an indication on the real leakage current measured thereby. Such a preferred embodiment of the electronic differential switch 20 of FIG. 3 is shown in FIG. 5.

In this case, the electronic differential switch 20 comprises an LED driving circuit 22. The LED driving circuit 22 comprises a resistive divider 23, in the exemplary embodiment shown in FIG. 5, connected between a further driving terminal Tp of the integrated circuit 8 and the second terminal E of the diode bridge 7, and including a first Ra1, a second Ra2, and a third Ra3 resistor, connected to a plurality of transistors T1, T2, and T3, which in turn are connected, through the series of respective diodes Db1, Db2, and Db3 and further resistive elements Rb1, Rb2, and Rb3 to the supply reference Va. The transistors T1, T2, and T3 are the LEDs driven by the LED driving circuit 22.

Figure 5:
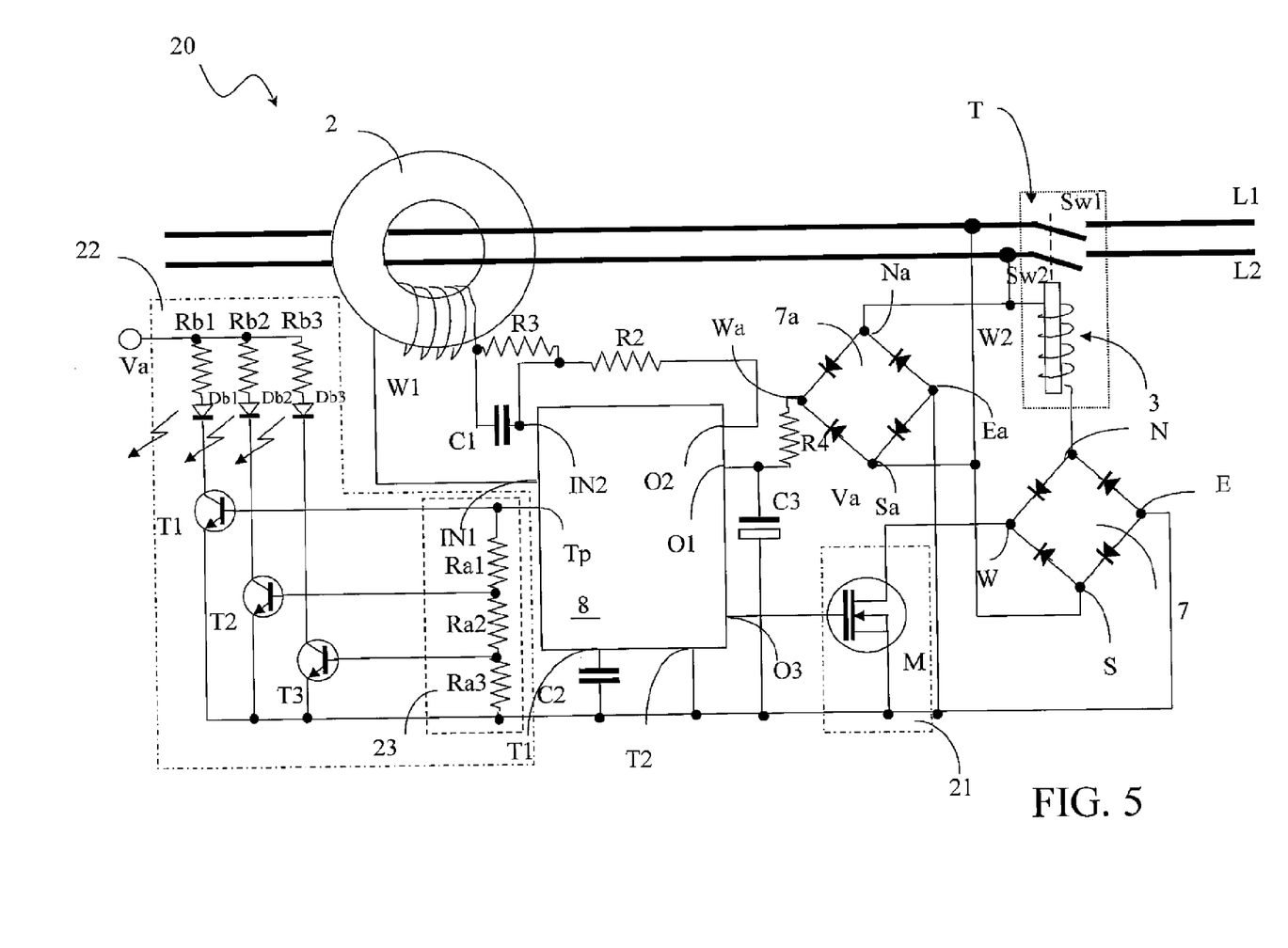
FIG. 5 shows a preferred embodiment of the electronic differential switch of FIG. 3.

The electronic differential switch 20 of the exemplary embodiment of FIG. 5 comprises a MOS transistor M that realizes the driven switch 21. The MOS transistor M has a control terminal connected to the third output terminal O3 of the integrated circuit 8. Naturally it is possible to use, in an equivalent way, switches of a different nature, such as IGBT, Bipolar, etc.

The electronic differential switch 20 also comprises a second diode bridge 7a that realizes a supply voltage of the integrated circuit 8 in an independent way with respect to the state of the system (the main switch T being open or closed). In particular, the second diode bridge 7a has respective first Na, second Ea, third Sa, and fourth Wa terminals, with the first terminal Na being connected to the second end of the second winding W2, the second terminal Ea being connected to the second terminal E of the diode bridge 7, and the third terminal Sa being connected to the third terminal S of the diode bridge 7.

Further, the fourth terminal Wa of the second diode bridge 7a is connected, through a third resistor R4 to the first output terminal of the integrated circuit 8.

Thus, the electronic differential switch 20 according to this embodiment of the present invention comprises resistors and capacitors apt to supply the integrated circuit 8 and to create suitable delays useful for the inner functions of the switch itself.

Figure 6:
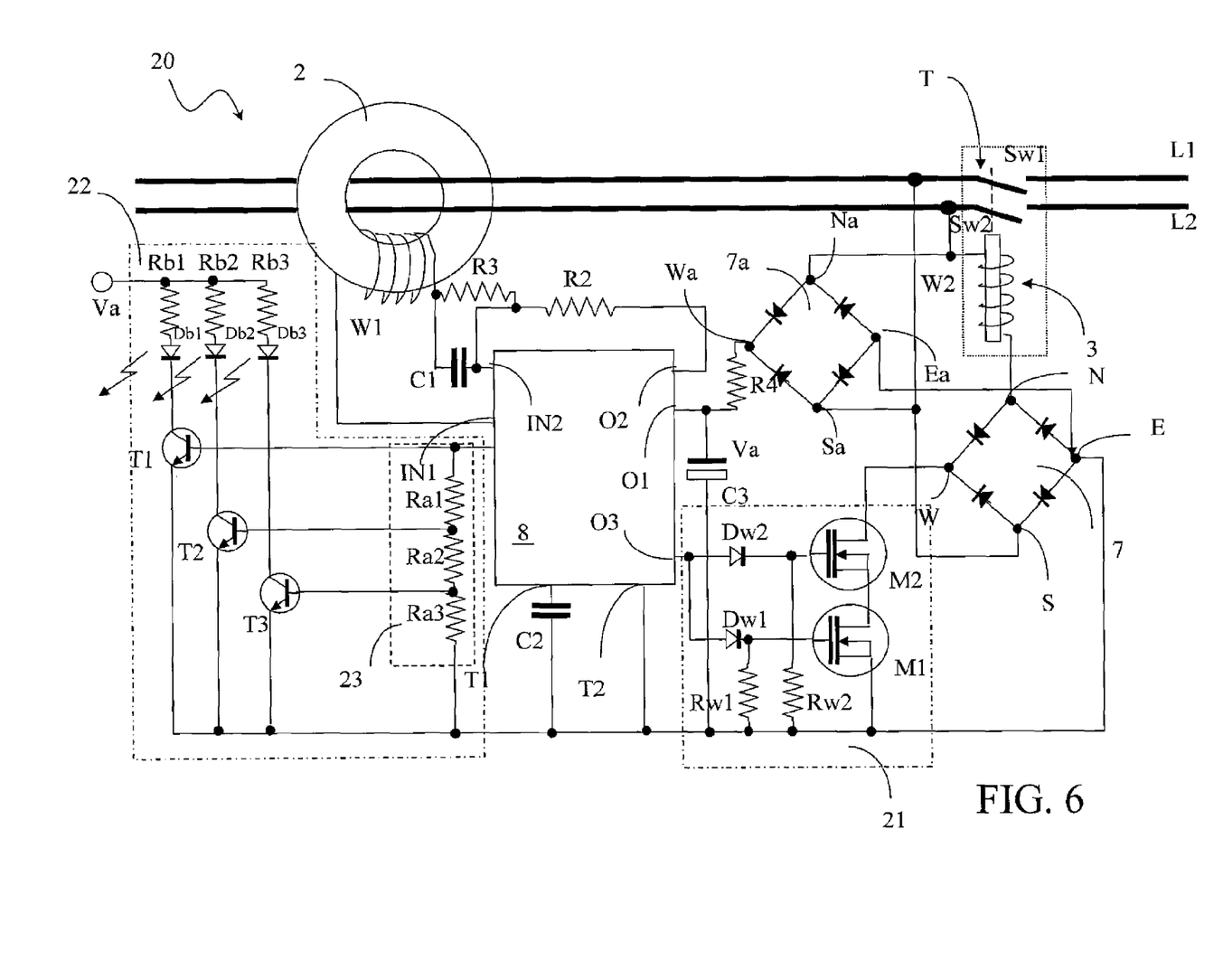
FIG. 6 shows a preferred embodiment of the electronic differential switch of FIG. 4.

Similarly, FIG. 6 shows a preferred embodiment of the electronic differential switch 20 of FIG. 4.

In this case, the driven switch 21 comprises a first M1 and a second M2 MOS transistor that implement the switches Q1 and Q2 of FIG. 4, suitably connected to the third output terminal O3 of the integrated circuit 8 and to the second terminal E of the diode bridge 7 through respective diodes, Dw1 and Dw2, and disconnecting resistors, Rw1 and Rw2. In particular, these diodes, Dw1 and Dw2, and disconnecting resistors, Rw1 and Rw2, ensure, in any case, the turn-off of the MOS transistors M1 and M2 and avoid, in case of failure of one of them, the damage of the other or of the integrated circuit 8 through a conductive path of the gate terminal.

In this case too it is possible to realize the switches Q1 and Q2, in an equivalent way, with switches of different nature, such as IGBT, Bipolar, etc.

In the examples shown in FIGS. 4-6, the main switch T is always shown in its open position, corresponding to the rest condition of the relay 3. The electronic differential switch 20 according to embodiments of the present invention ensures the safety conditions necessary for a differential switch thanks to the inversion of the driving logic governing its operation.

To achieve this, the electronic differential switch 20 comprises a switch driven by the integrated circuit 8, and a relay 3 having a stand-by rest condition in which the main switch T connected to the cables of the network with which the differential switch is associated is open.

In this way, in the absence of an alarm condition (for example, a failure) the integrated circuit maintains the driven switch 21 closed with subsequent excitation of the relay 3 and closure of the main switch T.

On the contrary, in the presence of an alarm condition the integrated circuit 8 opens the driven switch 21 and maintains it open for the whole duration of the alarm condition or failure, thus also maintaining the main switch T open.

Once the alarm condition ends (for example, in case of differential currents due to accidental causes such as a lightning strike), the main switch T is opened again by the driven switch 21, with an automatic resetting of the initial conditions.

Thus, the electronic differential switch 20 realizes, in a very simple way, a switch with automatic reset.

The electronic differential switch 20 can also ensure the safety of the system to which it is connected in the cases of failure of the switch itself, such as in case of failure of the integrated circuit 8 or in case of disconnection of a cable (phase cable L1 or neutral cable L2), ensuring the safety of the one downstream of the electronic differential switch 20 itself.

Moreover, the differential switch 20 dose not need a test circuit inserted between the phase cable L1 and the neutral cable L2 since it is able to test itself automatically and it opens by itself if there is a malfunction.

Additionally, in the embodiment of FIG. 4, the electronic differential switch 20 maintains safety conditions also in case of malfunction of the driven switch 21 contained therein, thanks to the cascade of two switches, with the possibility that both the switches are short-circuited in the same instant being negligible.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. An electronic differential switch connected to at least one phase cable and one neutral cable of an electric network, the electronic differential switch comprising:

a second winding having first and second ends, the first end of the second winding being directly connected to one of the phase and neutral cables;

a first winding associated with the second winding;

at least one toroid associated with the first winding;

a main switch connected to the phase and neutral cables;

a driving relay for the main switch, the second winding being associated with the driving relay;

a diode bridge;

an integrated circuit for measuring a differential current flowing in the first winding and generating a driving signal, the first and second windings being coupled to one another through the integrated circuit and the diode bridge; and at least one transistor having a control terminal that is connected to an output of the integrated circuit so that the control terminal receives the driving signal from the integrated circuit, the driving signal controlling the at least one transistor so as to:
in the absence of an alarm condition, turn on the at least one transistor, excite the driving relay, and close the main switch; or
in the presence of the alarm condition, turn off the at least one transistor, release the driving relay, and open the main switch,
wherein in case of failure of the integrated circuit, the at least one transistor is automatically maintained in the turn-off condition so that the main switch is automatically maintained in the open condition, so as to ensure safety of a downstream system to which the electronic differential switch is connected, and
the at least one transistor is coupled to the second end of the second winding through the diode bridge.

2. The electronic differential switch of claim 1, wherein the control terminal of the at least one transistor is directly connected to the output of the integrated circuit.

3. The electronic differential switch of claim 1, wherein the at least one transistor comprises first and second transistors connected in series, control terminals of the first and second transistors being connected to the output of the integrated circuit and receiving the driving signal.

4. The electronic differential switch of claim 3, further comprising a first decoupling diode coupled between the output of the integrated circuit and the control terminal of the first transistor, a second decoupling diode coupled between the output of the integrated circuit and the control terminal of the second transistor, a first decoupling resistor coupled between the control terminal of the first transistor and the diode bridge, and a second decoupling resistor coupled between the control terminal of the second transistor and the diode bridge.

5. The electronic differential switch of claim 1, further comprising a supply capacitor having a first terminal directly connected to a supply voltage terminal and to a second output of the integrated circuit, and a second terminal directly connected to the diode bridge.

6. The electronic differential switch of claim 1, wherein once the alarm condition ends, the integrated circuit automatically resets the electronic differential switch by automatically generating the driving signal so as to turn on the at least one transistor, excite the driving relay, and automatically re-close the main switch.

7. The electronic differential switch of claim 1, further comprising a second diode bridge coupled between the diode bridge and the first end of the second winding.

8. The electronic differential switch of claim 1, wherein the second end of the second winding is coupled to the other of the phase and neutral cables through the diode bridge.

9. The electronic differential switch of claim 1, wherein the transistor is directly connected to the diode bridge.

10. The electronic differential switch of claim 1, further comprising:
a capacitor connected between one end of the first winding and an input of the integrated circuit; and
a resistor connected in parallel with the capacitor between the one end of the first winding and the input of the integrated circuit.

11. The electronic differential switch of claim 1, further comprising a resistor, a second output of the integrated circuit being fed back to an input of the integrated circuit through the resistor, and one end of the first winding being connected to the input of the integrated circuit.

12. An electronic differential switch connected to at least one phase cable and one neutral cable of an electric network, the electronic differential switch comprising:
a second winding having first and second ends, the first end of the second winding being directly connected to one of the phase and neutral cables;
a first winding associated with the second winding;
at least one toroid associated with the first winding;
a main switch connected to the phase and neutral cables;
a driving relay for the main switch, the second winding being associated with the driving relay;
a diode bridge;
an integrated circuit for measuring a differential current flowing in the first winding and generating a driving signal, the integrated circuit being coupled to the first winding and the diode bridge; and
at least one transistor having a control terminal that is connected to an output of the integrated circuit so that the control terminal receives the driving signal from the integrated circuit, the driving signal controlling the at least one transistor so as to:
in the absence of an alarm condition, turn on the at least one transistor, excite the driving relay, and close the main switch; or
in the presence of the alarm condition, turn off the at least one transistor, release the driving relay, and open the main switch,
wherein in case of failure of the integrated circuit, the at least one transistor is automatically maintained in the turn-off condition so that the main switch is automatically maintained in the open condition, so as to ensure safety of a downstream system to which the electronic differential switch is connected, and
the at least one transistor is coupled to the second end of the second winding through the diode bridge.

13. The electronic differential switch of claim 12, wherein the control terminal of the at least one transistor is directly connected to the output of the integrated circuit.

14. The electronic differential switch of claim 12, wherein the at least one transistor comprises first and second transistors connected in series, control terminals of the first and second transistors being connected to the output of the integrated circuit and receiving the driving signal.

15. The electronic differential switch of claim 14, further comprising a first decoupling diode coupled between the output of the integrated circuit and the control terminal of the first transistor, a second decoupling diode coupled between the output of the integrated circuit and the control terminal of the second transistor, a first decoupling resistor coupled between the control terminal of the first transistor and the diode bridge, and a second decoupling resistor coupled between the control terminal of the second transistor and the diode bridge.

16. The electronic differential switch of claim 12, further comprising a supply capacitor having a first terminal directly connected to a supply voltage terminal and to a second output of the integrated circuit, and a second terminal directly connected to the diode bridge.

17. The electronic differential switch of claim 12, further comprising an LED driving circuit coupled to the integrated circuit.

18. The electronic differential switch of claim 12, further comprising a second diode bridge coupled between the diode bridge and the first end of the second winding.

19. The electronic differential switch of claim 12, wherein the integrated circuit and the diode bridge are coupled in series between the first and second windings.

20. A method for controlling an alarm condition in an electric network that includes a main switch, at least one phase cable and one neutral cable associated with the main switch, at least one driving relay for the main switch, a second winding associated with the at least one driving relay, a first winding associated with the second winding, a diode bridge, and an integrated circuit coupled to the driving relay through a transistor that is driven by a driving signal generated by the integrated circuit, the method comprising the steps of:

- directly connecting a first end of the second winding to one of the phase and neutral cables;
- connecting a control terminal of the transistor to an output of the integrated circuit such that the control terminal of the transistor receives the driving signal generated by the integrated circuit;
- coupling a second end of the second winding to the other of the phase and neutral cables through the diode bridge, and also coupling the second end of the second winding to the transistor through the diode bridge;
- in the absence of the alarm condition, closing the main switch by the integrated circuit controlling the transistor so as to turn on the transistor, excite the driving relay, and close the main switch;
- in the presence of the alarm condition, opening the main switch by the integrated circuit controlling the transistor so as to turn off the transistor, release the driving relay, and open the main switch;
- in case of failure of the integrated circuit, automatically maintaining the transistor in the turn-off condition so that the main switch is automatically maintained in the open condition, so as to ensure safety of a downstream system to which the main switch is connected; and
- automatically resetting initial conditions once the alarm condition ends through an automatic closing of the main switch by the integrated circuit controlling the transistor so as to turn on the transistor, excite the driving relay, and automatically re-close the main switch.

21. The method of claim 20, further comprising the step of maintaining the main switch open for the whole duration of the alarm condition by the integrated circuit controlling the transistor so as to maintain the transistor in the turn-off condition.

22. The method of claim 20,
wherein in the closing step, the integrated circuit supplies the driving signal in a first state to the control terminal of the transistor, and
in the opening step, the integrated circuit supplies the driving signal in a second state to the control terminal of the transistor.

23. The method of claim 20,
wherein in the closing step, the integrated circuit supplies the driving signal in a first state to control terminals of the transistor and another transistor connected in series, and
in the opening step, the integrated circuit supplies the driving signal in a second state to the control terminals of the transistor and the other transistor.

* * * * *